US011192022B2

(12) United States Patent
Travis et al.

(10) Patent No.: US 11,192,022 B2
(45) Date of Patent: Dec. 7, 2021

(54) CONTROLLED DYNAMIC MULTI-AXIS VIRTUAL REALITY SYSTEM

(71) Applicant: POSITRON, LLC, Glendale, CA (US)

(72) Inventors: Jeffrey Travis, Montrose, CA (US); Jennifer Rundell, Santa Monica, CA (US); Ricardo Ruiz-Torres, Los Angeles, CA (US); Mehul Dilip Sati Kunvar, Glendale, CA (US)

(73) Assignee: POSITRON VOYAGER, INC., Los Angeles, CA (US)

( * ) Notice: Subject to any disclaimer, the term of this patent is extended or adjusted under 35 U.S.C. 154(b) by 0 days.

(21) Appl. No.: 16/797,606

(22) Filed: Feb. 21, 2020

(65) Prior Publication Data
US 2020/0188778 A1   Jun. 18, 2020

Related U.S. Application Data

(63) Continuation of application No. 15/782,801, filed on Oct. 12, 2017, now Pat. No. 10,596,460.
(Continued)

(51) Int. Cl.
*A63G 31/16* (2006.01)
*A63F 13/90* (2014.01)
(Continued)

(52) U.S. Cl.
CPC .............. *A63F 13/285* (2014.09); *A47C 1/00* (2013.01); *A47C 1/0242* (2013.01); *A47C 3/12* (2013.01);
(Continued)

(58) Field of Classification Search
CPC ........ A63G 31/00; A63G 31/02; A63G 31/04; A63G 31/06; A63G 31/08; A63G 31/16;
(Continued)

(56) References Cited

U.S. PATENT DOCUMENTS 4,887,967 A * 12/1989 Letovsky ............... G09B 9/058
434/61
5,364,270 A    11/1994 Aoyama et al.
(Continued)

FOREIGN PATENT DOCUMENTS

| CN | 105536268 | 5/2016 |
| CN | 205197549 | 5/2016 |

(Continued)

OTHER PUBLICATIONS

"The Internet Chair", by Michael Cohen, IJHCI: Int'l. J of Human-Computer Interaction 15.2, 2003, p. 297-311.
(Continued)

*Primary Examiner* — Kien T Nguyen
(74) *Attorney, Agent, or Firm* — Karish & Bjorgum, PC

(57) ABSTRACT

An improved virtual reality system comprises a chair 110 integrated with a pedestal 120, which contains a motion platform 150 and base 160. The chair 110 can be rotated continuously in the yaw axis by a stepper motor 230 and substantially in the pitch axis by an additional stepper motor 240 in coordination with the content of the VR display as directed by a chair controller located on the motion platform 150.

15 Claims, 5 Drawing Sheets

Related U.S. Application Data

(60) Provisional application No. 62/407,521, filed on Oct. 13, 2016.

(51) Int. Cl.
*A63F 13/285* (2014.01)
*A47C 3/12* (2006.01)
*A47C 1/024* (2006.01)
*A47C 7/72* (2006.01)
*A63F 13/98* (2014.01)
*A47C 1/00* (2006.01)
*A47C 3/18* (2006.01)
*A47C 7/00* (2006.01)
*A47C 7/56* (2006.01)
*G06F 3/01* (2006.01)

(52) U.S. Cl.
CPC ............... *A47C 3/18* (2013.01); *A47C 7/004* (2013.01); *A47C 7/56* (2013.01); *A47C 7/72* (2013.01); *A47C 7/723* (2018.08); *A47C 7/727* (2018.08); *A63F 13/90* (2014.09); *A63F 13/98* (2014.09); *A63G 31/16* (2013.01); *G06F 3/016* (2013.01); *A63F 2300/8082* (2013.01)

(58) Field of Classification Search
CPC ... G09B 9/00; G09B 9/02; G09B 9/08; G09B 9/14
USPC .......... 472/59–61, 130; 434/29, 55; 463/1, 7
See application file for complete search history.

(56) References Cited

U.S. PATENT DOCUMENTS

| | | | |
|---|---|---|---|
| 5,490,784 A | 2/1996 | Carmein | |
| 5,515,078 A | 5/1996 | Greschler et al. | |
| 5,562,572 A | 10/1996 | Carmein | |
| 5,685,718 A | 11/1997 | McClintic | |
| 5,695,406 A | 12/1997 | Park | |
| 5,768,122 A | 6/1998 | Motoc | |
| 5,791,903 A | 8/1998 | Feuer et al. | |
| 6,007,338 A | 12/1999 | DiNunzio et al. | |
| 6,024,407 A | 2/2000 | Eakin | |
| 6,095,926 A | 8/2000 | Hettema et al. | |
| 6,162,058 A * | 12/2000 | Yang | G09B 9/14 434/55 |
| 6,224,380 B1 | 5/2001 | Lo et al. | |
| 6,793,495 B2 | 9/2004 | Kang | |
| 8,241,038 B2 | 8/2012 | Quinn et al. | |
| 8,608,475 B2 | 12/2013 | Roy et al. | |
| 8,641,540 B2 | 2/2014 | Feuer et al. | |
| 8,777,313 B2 | 7/2014 | Butt et al. | |
| 9,178,849 B2 | 11/2015 | Senecal et al. | |
| 2001/0041326 A1 | 11/2001 | Zeier | |
| 2002/0115043 A1* | 8/2002 | Baker | G09B 9/08 434/30 |
| 2003/0215119 A1 | 11/2003 | Uppaluri et al. | |
| 2005/0069839 A1 | 3/2005 | Denne | |
| 2007/0269771 A1 | 11/2007 | Lefton | |
| 2009/0163283 A1 | 6/2009 | Childress | |
| 2009/0218860 A1 | 9/2009 | Hernandez et al. | |
| 2014/0085414 A1 | 3/2014 | Zhou et al. | |
| 2014/0157916 A1 | 6/2014 | Vatcher et al. | |
| 2015/0157951 A1 | 6/2015 | Lee et al. | |
| 2015/0246291 A1 | 9/2015 | Milam et al. | |
| 2015/0269780 A1 | 9/2015 | Herman et al. | |
| 2016/0195923 A1 | 7/2016 | Nauseef et al. | |
| 2016/0213148 A1 | 7/2016 | Choi | |

FOREIGN PATENT DOCUMENTS

| | | |
|---|---|---|
| CN | 105676706 | 6/2016 |
| CN | 205494990 | 8/2016 |
| JP | 11296064 | 10/1999 |
| KR | 100527386 | 2/2005 |
| KR | 1020120096970 | 9/2012 |
| WO | 2011144228 | 11/2011 |
| WO | 2016110686 | 7/2016 |

OTHER PUBLICATIONS

"Control System for the Schaire Internet Chair", by Uresh Chandaka Duminduwardena, et al., Conference Paper—Oct. 2004, IEEE Xplore, pp. 1-4.

"Multimodal Wayfinding in a Driving Simulator for the Schaire Internet Chair, a Networked Rotary Motion Platform", by Kazuya Adachi, et al., 2005, pp. 1-4.

International Search Report and Written Opinion, dated Feb. 20, 2018.

\* cited by examiner

CONTROLLED DYNAMIC MULTI-AXIS VIRTUAL REALITY SYSTEM

CROSS-REFERENCE TO RELATED APPLICATIONS

This present application is a continuation of U.S. patent application Ser. No. 15/782,801, filed on Oct. 12, 2017, which further claimed benefit under 35 U.S.C. § 119(e) to U.S. Provisional Application Ser. No. 62/407,521, filed on 13 Oct. 2016, the contents of which are incorporated herein by reference in their entirety.

BACKGROUND OF THE INVENTION

The present invention relates to an apparatus for, and method of use of a self-contained virtual reality system in which virtual reality ("VR") images are shown within a self-contained display system in which motion profiles of perceived motion are used to control motion of the display system about two or more axes of rotation.

SUMMARY OF THE INVENTION

The present invention relates to system for the improvement of the experience of a virtual reality presentation and, in at least one embodiment, is comprised of a multi-axis motion controlled chair on which the user is seated while viewing the virtual reality presentation. The presentation is viewed through a display, VR headset or VR goggles provided in conjunction with the viewing chair. Motion of the chair about two or more rotational axes, in the preferred embodiment, the pitch and yaw axes, is controlled in conjunction with the virtual reality presentation to enhance the user experience. By controlling the motion of the chair through motion profiles defined in conjunction with, cued to, and encoded with the virtual reality presentation, the virtual reality experience is improved. Optionally, the motion of the chair may be controlled by the user, creating an interactive VR experience. Through coordination of motion of the chair in the motion controlled axes in coordination with the apparent motion of the VR presentation as viewed by the user, sensations of motion in directions and about axes not actually in motion can be induced in the user. Additionally, the motion sickness like symptoms experienced by some users of other virtual reality systems are reduced with the present system.

The use of specialty seating devices in conjunction with entertainment has a long history. In the 1950s, special theatre seats were equipped with devices for releasing scents at key points during movies or applying a mild electrical shock to theatre goers to enhance the fright or surprise of certain scenes. As early as 2003, Cohen proposed using special chairs as user input devices or aids for working with computers. See, e.g., Michael Cohen. "The Internet Chair". In: IJHCI: Int. J. of Human-Computer Interaction 15.2 (2003). Ed. by Steve Mann and Woodrow Barfield, pp. 297-311. Additionally, large motion control platforms and seating have been used in conjunction with amusement park rides, such as Disney's Star Tours attraction. None of these provides an individual integrated VR viewing platform that provides controlled motion in two or more axes in conjunction with a VR presentation.

In the preferred embodiment, the VR display system, the motion control actuators, and the computational processing equipment required to display the VR presentation and to control the chair are all integrated into a chair. Through this integration, concerns about placement of the components of the system, the cabling necessary for connecting the systems, and clearances or interference between those components or cables and the free motion of the VR chair, which are major safety and operational concerns are eliminated. This approach makes installation of the chairs much simpler as power is the only required physical connection.

A chair embodying the present invention is preferably mounted to a motion platform that is in turn coupled to a base. The motion platform can rotate in a yaw axis relative to the base. The yaw axis is a vertical axis projecting through or near the center of the chair. By including all control mechanisms on the motion platform such that they move with the chair, only power need be transferred from the base to the motion platform. This may be preferentially achieved through a slip ring although it would be apparent to one of ordinary skill in the art that other power transfer mechanism which allow for one rotational degree of freedom would also suffice. Through the use of a slip ring for power transfer, it is possible for the motion platform to have an unlimited range of yaw rotation relative to the base.

In addition to yaw rotation, the invention can rotate in pitch. This allows the chair to tip forward and back. Unlike yaw rotation pitch rotation is practically limited. Pitching too far forward would run the risk of ejecting users from the chair and pitching too far to the back could leave the user effectively resting on their back, partially inverted, in an uncomfortable viewing position. The ability to control pitch also allows for the chair to be pitched forward to ease entry of users into the chair.

Control of the pitch and yaw rotation may be coordinated with apparent motion reflected in the virtual reality image being viewed by the user. This coordination may serve multiple functions. The first is to guide the user through a virtual experience, aiming their body towards a point of interest, for example, following a character as it moves within the virtual environment across the 360-degree canvas or traversing through a six degree-of-freedom virtual environment.

A second purpose is to create physical sensations similar to those that would be experienced if the user were actually moving in the virtual reality environment. For example, if the VR content showed the user in a vehicle that suddenly braked hard, the system can pitch forward quickly to simulate the acceleration forces that would be felt if the user were in a vehicle that was braking.

A third purpose for the coordinated rotations is to create sensations of perceived motion along an axis that the system does not actually physically support, but which the user perceives to be moving along that axes anyway. For example, a system can provide the user with the sensation that he or she is moving in an upward vertical movement, if the VR content camera moves in this direction, and playback is combined with pitching the chair back and a slow yaw rotation. This perceived motion is a result of stimulating the proprioceptive sensory system in a user using the motion platform, combined with the visual stimuli from the VR headset. Perceived motion sensations of translation along the vertical and two horizontal axes are possible by combining certain VR visual content with certain yaw and pitch motion.

The content creator can create series of motions for each of the two axes that together form a unique motion track that is then imposed to the user. This enhances the immersive nature of the virtual reality experience, reinforces the apparent sense of motion by the user, and can allow the user to feel as if he or she is moving in directions which are not practically possible in practice within the chair device, such as translation. This may be accentuated through the use of directional audio.

The visceral sensation of the user is further enhanced by the incorporation of haptic stimulation. A compact vibrational sound source is incorporated into the back or seating surface of the chair to allow for the transmission of vibration to the user, thereby enhancing the user experience. Commercially available haptic accessories such as those produced by Subpac, Inc. may be used.

The operation of the chair may preferentially be enhanced by the inclusion of integrated cabin lighting that lights the interior of the seating area of the chair. The lighting may be coordinated with the virtual reality presentation to provide environmental mood lighting enhancing the VR presentation. The lighting may also be used to provide feedback regarding the operation of the chair to external monitors or operators. Lighting cues, not visible to a user wearing an immersive VR headset, but visible to someone observing the chair, can provide status, performance, and cueing information.

The present invention may be used with two types of VR content that can be played back: non-interactive and interactive. In non-interactive VR content, the user is presented with the same VR experience every time the content is played back, and the user has no control over the experience other than being able to look around the virtual environment. For interactive content, the user can affect the content playback to change the experience. The two types of content provide different challenges for designing motion profiles to create perceived motion trajectories relative to the content.

For any given non-interactive VR experience, a custom motion track may be created. Trajectories for each motion axis are generated by selecting directions of interest at particular timecodes from the experience and setting a desired acceleration and deceleration. The velocities needed for the chair to go from one direction of interest to the next one given the relative times and desired accelerations and decelerations are calculated and reflected in lists of motions with the time at which they should begin, along with the final direction of the chair, the acceleration and deceleration.

There are two approaches for interactive VR experiences, i.e., experiences that do not follow a predefined linear timeline: (1) pre-generation of multiple possible motion profiles and (2) direct kinematic command of the motion actuators.

When using the direct kinematic command approach, the VR application will transmit kinematic data from one of the virtual objects (eg, a character, a vehicle, the VR camera). This form of motion control allows for a more flexible implementation that does not depend on precomputed trajectories. For example, where the user is controlling a simulated vehicle with an input device such as a joystick or other control interface, the motion platform responds according to the dynamics of the virtual environment.

When using multiple pre-generated motion profiles, as the experience progresses and certain action or event triggers a desired motion, the VR player, typically programmed using a gaming engine, sends a command to the motion controller containing the unique identifier of the desired motion trajectory and starts a timer that keeps being transmitted for as long as the motion trajectory lasts. The motion controller loads the appropriate motion track and plays it back using the timer information received from the VR player.

A combination of non-interactive with interactive trajectory motion control methods allows for the platform to combine precomputed complex movements with motions controlled by the user. In the example of a simulated vehicle, the user can control the trajectory of the simulated vehicle and a superimposed pre-computed motions can simulate the effect of rough terrain.

Additionally, for either interactive or non-interactive content, motion may optionally be controlled by the user's gaze. The difference in direction between the VR headset and the chair is computed and the chair is moved in the direction indicated by the headset. The speed of movement may be given by linear or non-linear functions of the directional difference. A desirable deadband, an angular range where the chair doesn't move even if the user is moving their head, which allows the user to explore the immediate environment without moving the chair may be maintained.

In some embodiments, a hybrid control mode, where the user is able to control the direction of the chair within an adjustable angular range may be enabled. Hybrid control allows the creator of the motion trajectory to define where the user should be looking with approximate parameters while giving the user some freedom to explore the virtual environment. At the limit where there is no effective limit on the angular deviation from the pre-planned pointing, the hybrid mode becomes indistinguishable from user controlled motion. At the opposite limit, where the allowed angular deviation is zero, the hybrid mode would be indistinguishable from pre-defined motions.

Whether in interactive, non-interactive, or hybrid operations, the direct control of the devices actuating the motion of the chair is performed by a controller physically located on the motion platform. Placement of the controller on the motion platform eliminates the need to for high resolution actuator control signals to be communicated across the rotating interface between the motion platform and the base. Optionally, the controller may be equipped with a wireless communications link, that allows for the reception of external messages or signals. These may include cues to synchronize the activities of multiple chairs. The use of wireless signals to a controller located on the motion platform eliminates the need for complicated wiring required for synchronizing the activities of multiple chairs seen in the prior art.

BRIEF DESCRIPTION OF THE DRAWINGS

The features, aspects and advantages of the present invention will become better understood with regard to the following description, appended claims and accompanying figures wherein:

DETAILED DESCRIPTION

In the following description of the preferred embodiments, reference is made to the accompanying drawings which show by way of illustration specific embodiments in which the invention may be practiced. Wherever possible, the same reference numbers will be used throughout the drawings to refer to the same or like parts. It is to be understood that other embodiments may be utilized and structural and functional changes may be made without departing from the scope of the present invention.

Figure 1A:
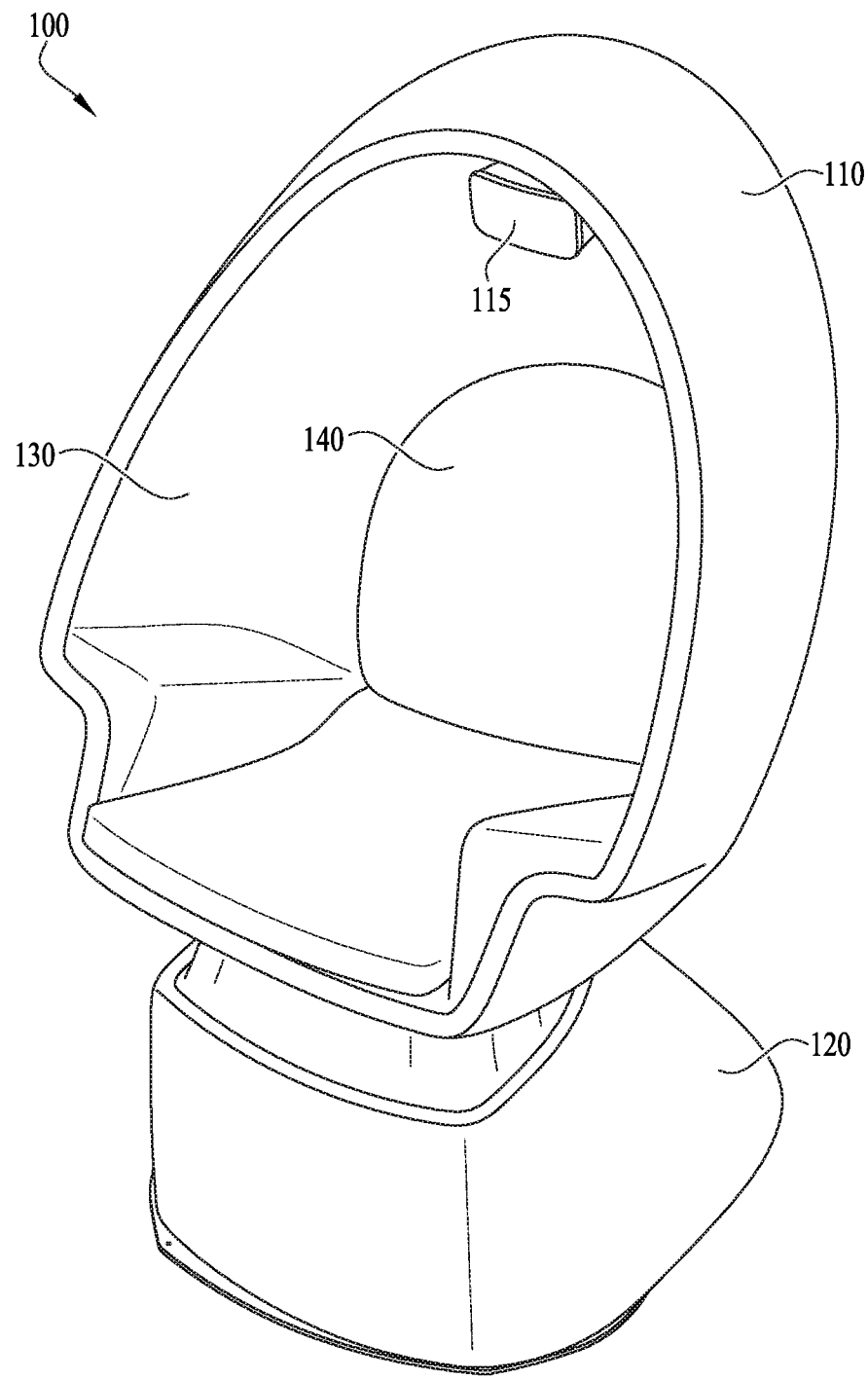
FIG. 1A illustrates the exterior appearance of a VR chair according to an embodiment of the present invention.

FIG. 1A illustrates an embodiment of a VR system 100 according to the present invention. It is comprised of a VR chair 110 mounted onto a pedestal unit 120. A user sits in the interior 130 of the chair 110 and dons a VR headset 115 or begins watching a VR display mounted to the chair 110. The chair 110 moves based on actuation by control mechanisms located in the pedestal unit 120. As will be discussed further below, the chair 110 connects to actuators located within the pedestal unit 120. Because, preferentially, the actuation functionality is integrated into the pedestal unit 120, the shape, size, and configuration of the VR chair 110 can be modified with little difficulty, thus allowing for different user experiences and alternative branding.

Figure 1B:
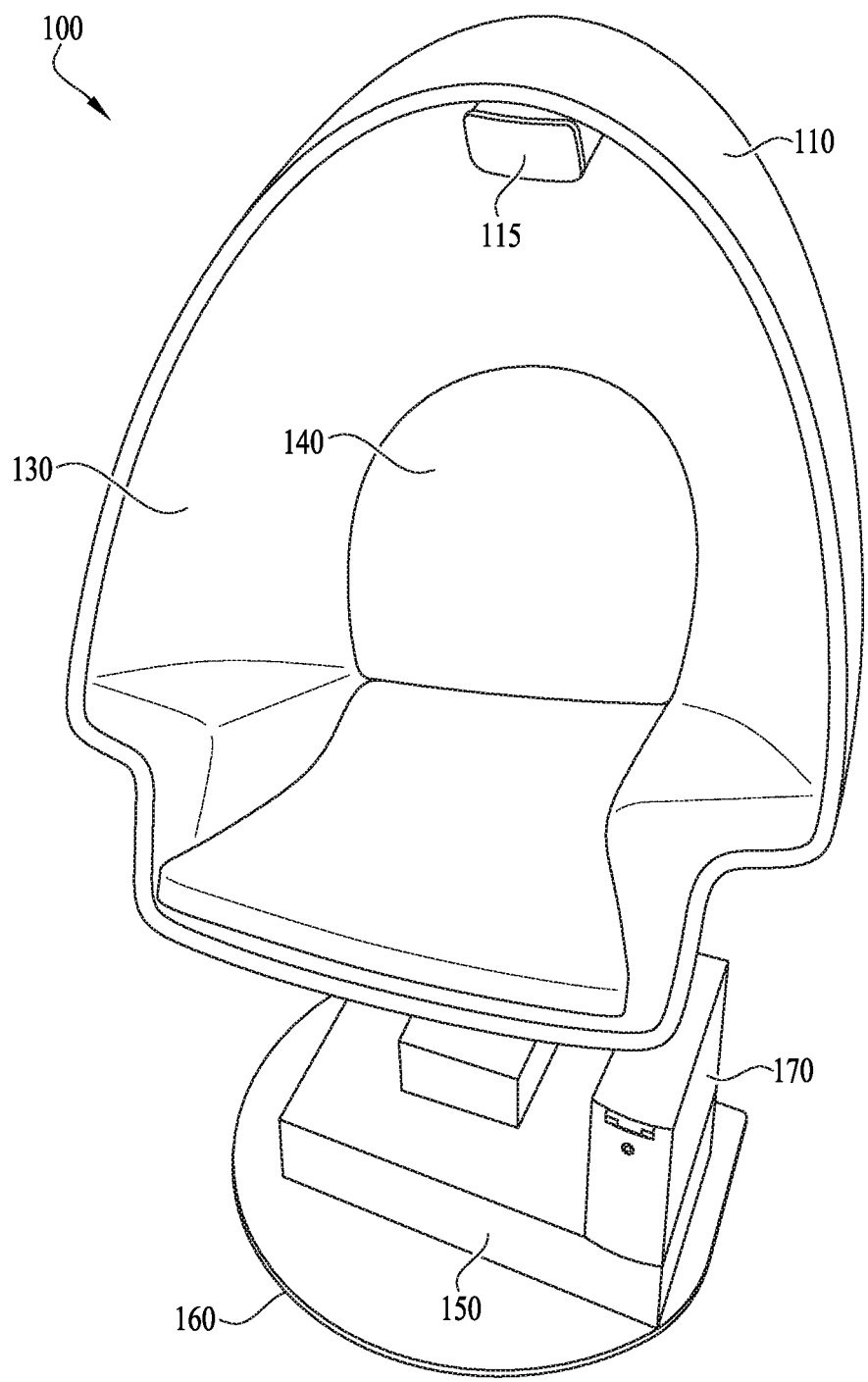
FIG. 1B illustrates the exterior appearance of a VR chair without a cover over the pedestal according to an embodiment of the present invention.

FIG. 1B illustrates an exterior view of the front of a VR system 100 according to an embodiment of the invention. The cover of the pedestal unit 120 is removed to reveal the placement of motion platform 150 and the base 160 in the pedestal unit 120. A controller housing 170 is mounted upon the motion platform 150. The controller, which is preferably located in the controller housing 170, directs the physical motion and activity of the chair. Locating the controller within the controller housing 170 on the motion platform eliminates the need for commands to control the actuators to be communicated from off of the motion platform 150. The controller housing 170 may be located either at the side of the motion platform 150 as shown in FIG. 1B or in the front of the motion platform as shown in subsequent Figures. A wireless communications link is optionally provided to the controller for receiving messages or cues from outside of the system 100. Because detailed control of the actuators located in the motion platform 150 is provided by the controller, synchronized motion of a plurality of systems 100 can be achieved through the use of messages or cues communicated via a wireless link. Use of such a wireless communications link and standard communications techniques such as, preferentially, UDP with acknowledgement, allows for robust and reliable synchronization of multiple systems 100 without the complicated, costly, and unreliable wiring otherwise required.

A rear cushion 140 lines the back of the interior 130 of the chair 110. Enclosed within the rear cushion 140 is a haptic device. The haptic device provides vibrational stimulation to the user, increasing the immersive nature of the VR experience. Inclusion of the haptic device within the interior 130 of the chair 110, eliminates the need for users to wear a haptic vest or other such device.

Figure 2A:
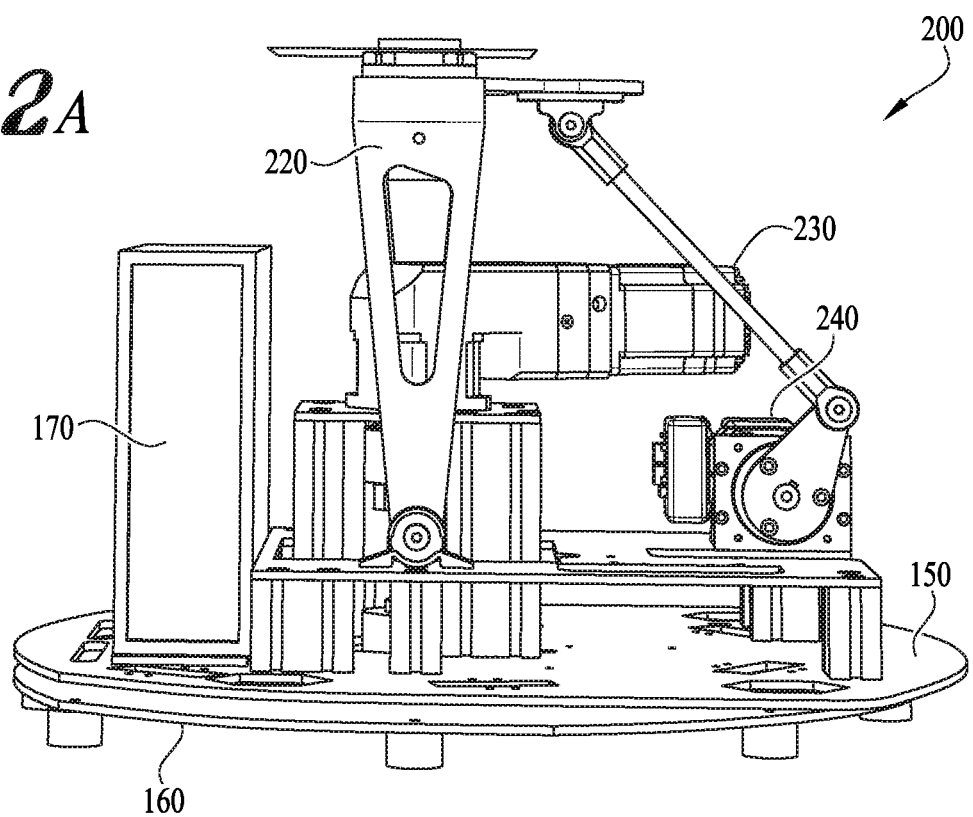
FIG. 2A illustrates a side view of the base portion of an embodiment of a VR chair according to the present invention.
Figure 2B:
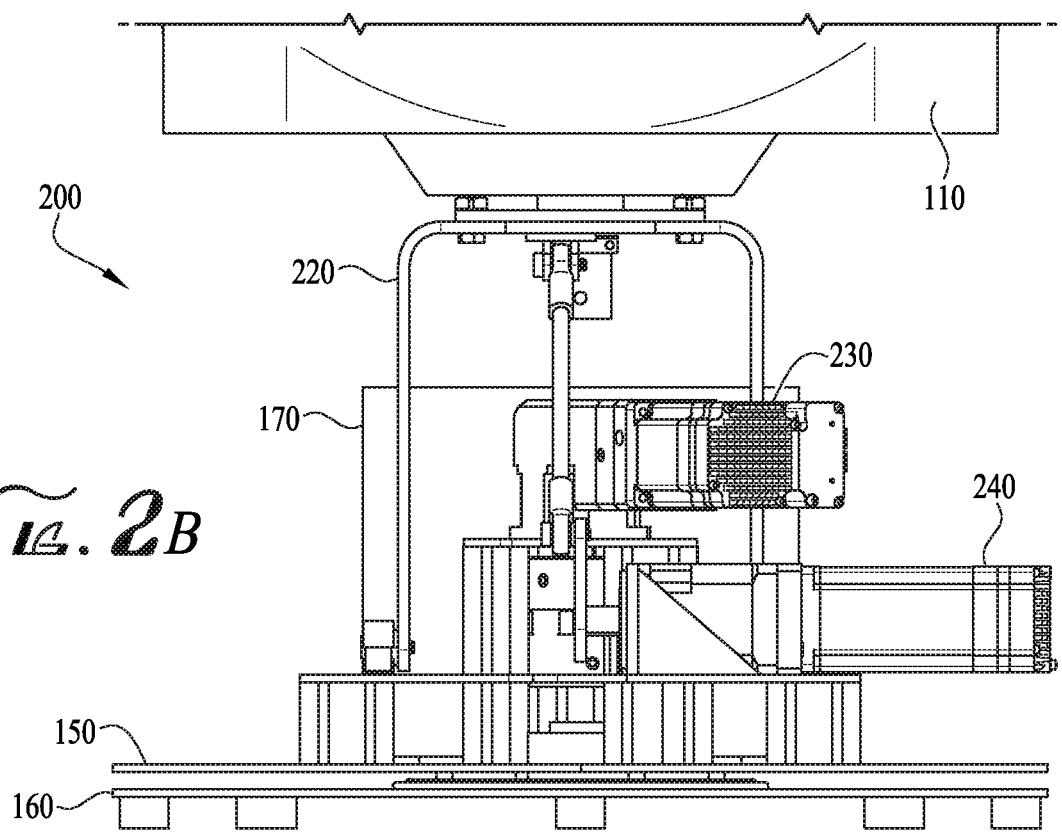
FIG. 2B illustrates a rear view of the base portion of an embodiment of a VR chair according to the present invention.

FIG. 2A illustrates a side view of the inner workings 200 of a pedestal unit 120 of an embodiment of the present invention with its outer housing removed for visibility. FIG. 2B illustrates a rear view of the same inner workings 200 of a pedestal unit 120 of an embodiment of the present invention with its outer housing removed for visibility. The pedestal unit 120 is comprised of a base 160, upon which a motion platform 150 rides on a yaw bearing, in common parlance often called a lazy-susan bearing 450 (see FIG. 4.) A servo-controlled stepper motor or yaw motor 230 drives the yaw rotation of the motion platform 150 relative to the base 160. A second motor 240 causes a saddle 220 to rotate in pitch. The saddle 220 is directly connected to the chair 110 and to the motion platform 150. Thus both the pitch angle and the yaw angle as well as the rates of change of pitch and yaw may be controlled by the controller relative to the stationary base 160.

Figure 3A:
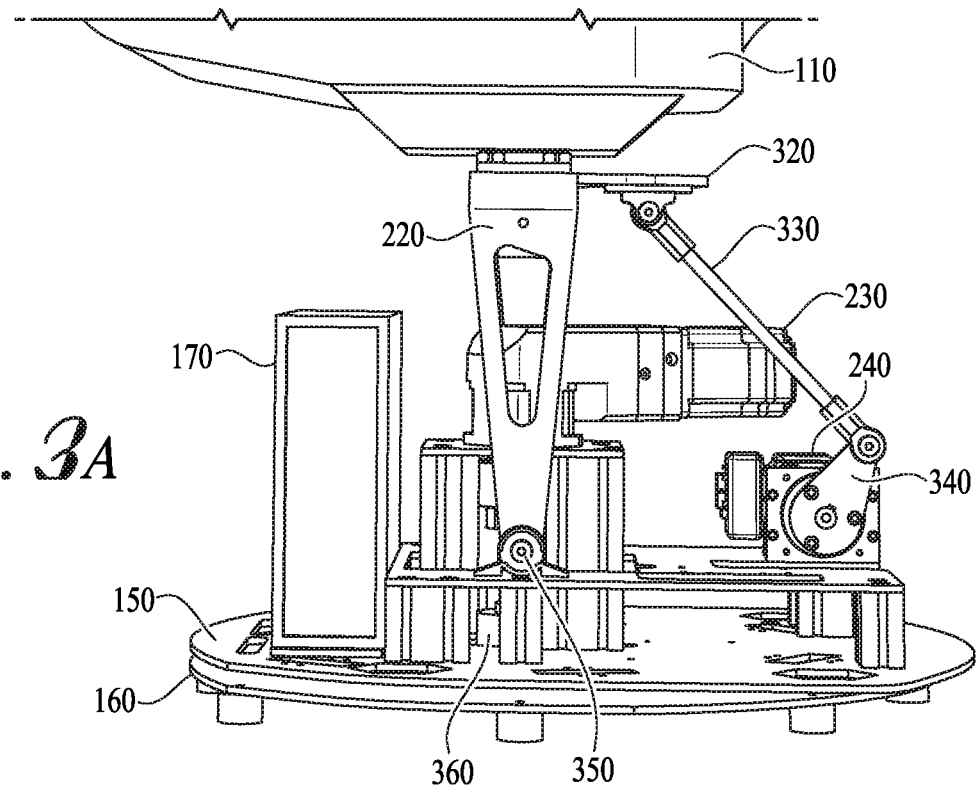
FIG. 3A illustrates a side view of the base portion of an embodiment of a VR chair according to the present invention in neutral pitch position.
Figure 3B:
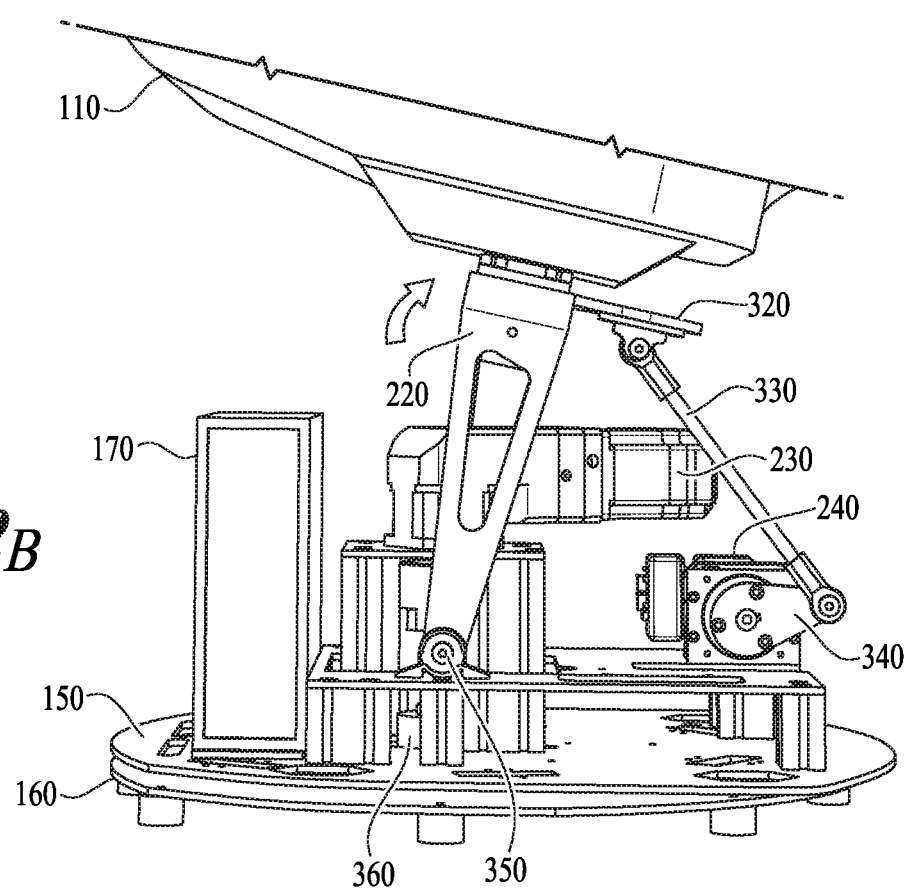
FIG. 3B illustrates a side view of the base portion of an embodiment of a VR chair according to the present invention in rearward pitch position.
Figure 3C:
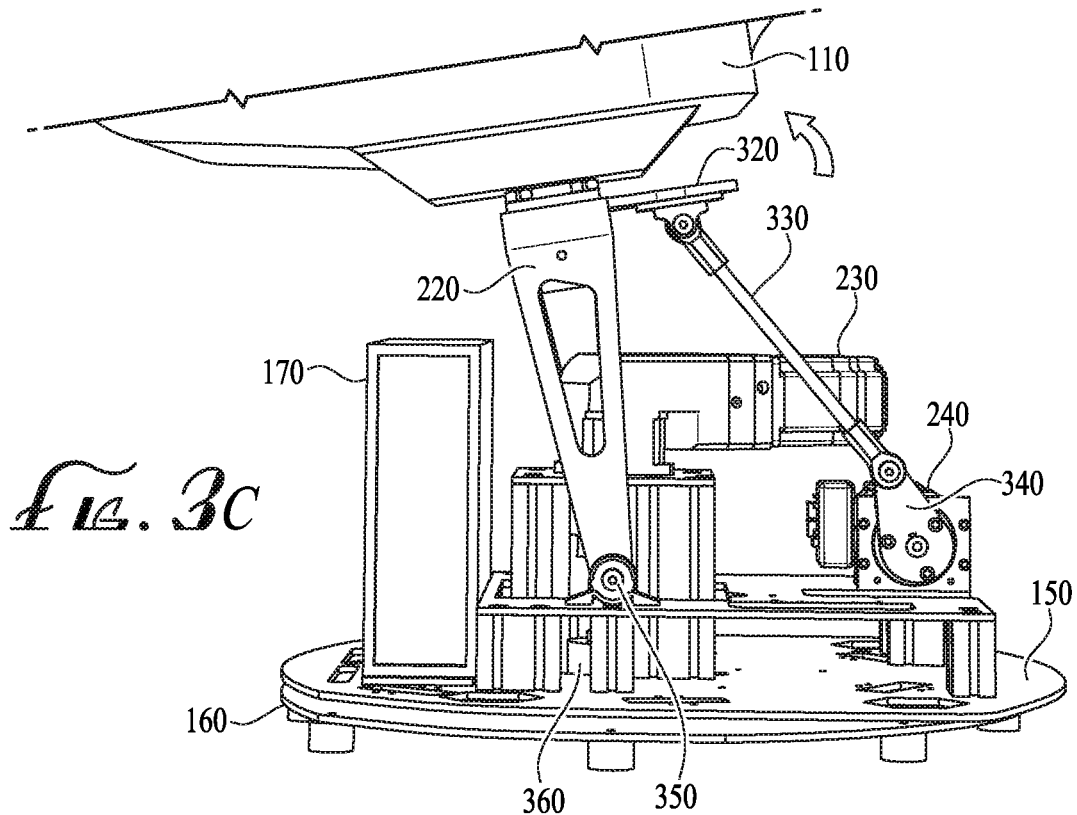
FIG. 3C illustrates a side view of the base portion of an embodiment of a VR chair according to the present invention in forward pitch position.
Figure 4:
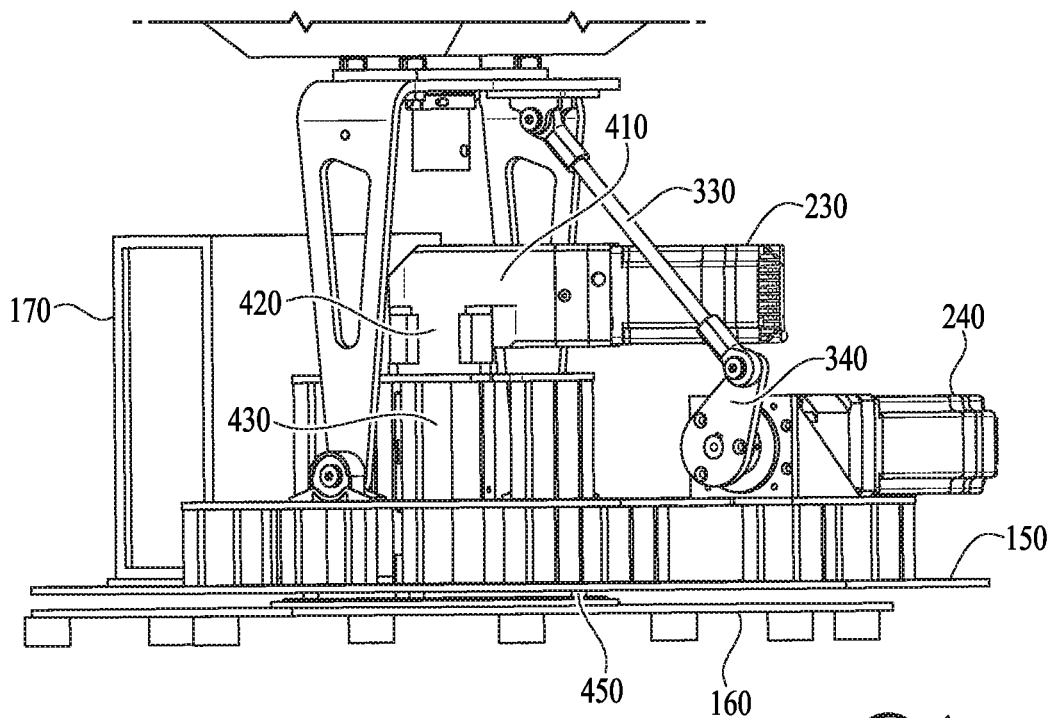
FIG. 4 illustrates view of the base portion of an embodiment of a VR chair according to the present invention.

FIG. 4 illustrates the yaw rotation mechanism of an embodiment of the present invention. The yaw motor 230 is coupled to a gearbox 410. The output of the gearbox 410 is transferred to the base shaft 430 via a coupler 420. The yaw motor 230 is preferentially a controlled stepper motor. When activated the rotation of the primary shaft of the yaw motor 230 is transferred through the gearbox 410 and the coupler 420 to the base shaft 430, which connects directly to the base 160. As the base is stationary, rotation of the yaw motor causes the motion platform 150 to which the motor 230 is attached to rotate in yaw relative to the base 160 upon a lazy-susan bearing 450. A slip ring 360, also shown in FIGS. 3A, 3B, and 3C, allows for the transfer of power from the base 160 to the rotating motion platform 150 even during active yaw rotation. Preferentially, a magnetic sensor (not shown) mounted to the bottom of the motion platform 150 can detect the presence of a magnet (not shown) mounted to the base 160, thus establishing the position of the motion platform 150 relative to the base 160.

FIGS. 3A, 3B, and 3C illustrate the pitch rotation mechanism for an embodiment of the present invention in a chair 110 neutral (FIG. 3A), pitched back (FIG. 3B), or pitched forward (FIG. 3C) position. Pitch of the chair 110 relative to the base 160 is achieved in the embodiment via the use of the second servo-controlled stepper motor 240. Rotation of the shaft of the motor 240, rotates an eccentric 340, to which an actuator arm 330 is attached. The opposite end of the actuator arm 330 is attached to a projection 320 from the saddle 220. Rotation of the motor 240, results in a pitch rotation of the saddle 220 about a saddle bearing 350, which in turns causes the chair 110, which is connected to the saddle 220, to either pitch forward or pitch back depending on the direction of rotation of the motor 240.

There is disclosed in the above description and the drawings, a system that fully and effectively overcomes the disadvantages associated with the prior art. However, it will be apparent that variations and modifications of the disclosed embodiments may be made without departing from the principles of the invention. The presentation of the preferred embodiments herein is offered by way of example only and not limitation, with a true scope and spirit of the invention being indicated by the following claims.

Any element in a claim that does not explicitly state "means" for performing a specified function or "step" for performing a specified function, should not be interpreted as a "means" or "step" clause as specified in 35 U.S.C. § 112.

What is claimed is:
1. A virtual reality viewing station comprising:
  a pedestal, further comprising a base and a motion platform;
  a yaw bearing allowing unlimited rotation, exclusively in the yaw axis, of the motion platform relative to the base; and a chair connected to the motion platform, wherein the chair can rotate in pitch about a horizontal axis that is fixed relative to the motion platform, and wherein the motion platform further comprises a saddle, wherein the saddle is connected to the chair and rotates about the horizontal axis that is fixed relative to the motion platform, and wherein the rotation of the saddle about the horizontal axis drives the rotation in pitch of the connected chair.

2. The virtual reality viewing station of claim 1, wherein the rotation of the yaw bearing is driven by a yaw motor mounted on the motion platform, and wherein the yaw motor is connected by a base shaft to the base.

3. The virtual reality viewing station of claim 2, wherein the rotation in pitch about the horizontal axis that is fixed relative to the motion platform is driven by a pitch motor that is mounted on the motion platform.

4. The virtual reality viewing station of claim 3, wherein the pitch motor and the yaw motor are controlled by a controller mounted on the motion platform.

5. The virtual reality viewing station of claim 4, wherein the pitch and yaw of the chair are controlled by programming executed in the controller without user input.

6. The virtual reality viewing station of claim 4, wherein the pitch and yaw of the chair, when coordinated with a video presentation displayed to a user, results in the user perception of motion not physically being experienced by the user.

7. The virtual reality viewing station of claim 1, wherein the rotation of the saddle about the horizontal axis fixed relative to the motion platform is driven by a pitch motor, wherein the pitch motor rotates an eccentric; the eccentric is connected to an actuator arm that is connected at a first end to the eccentric and at a second end to a projection extending from the saddle, and wherein a rotation of the pitch motor, causes the saddle to rotate about the horizontal axis fixed relative to the motion platform.

8. The virtual reality viewing station of claim 7, wherein the rotation of the yaw bearing is driven by a yaw motor mounted on the motion platform, and wherein the yaw motor is connected by a base shaft to the base.

9. The virtual reality viewing station of claim 8, wherein the yaw motor is connected to the base shaft via a gearbox.

10. The virtual reality viewing station of claim 1, further comprising:

a pitch motor, mounted on the motion platform, to rotate the chair in pitch, a yaw motor, mounted on the motion platform, to rotate the motion platform in yaw relative to the base, wherein the motion platform further comprises a saddle, wherein the saddle is connected to the chair and rotates about the horizontal axis that is fixed relative to the motion platform, and wherein the rotation of the saddle about the horizontal axis drives the rotation in pitch of the connected chair, and a controller, mounted on the motion platform, to control the pitch and yaw motors.

11. The virtual reality viewing station of claim 10, wherein the pitch and yaw of the chair, when coordinated with a video presentation displayed to a user, results in a user perception of motion not physically being experienced by the user.

12. A virtual reality station comprising:

a base and a motion platform;

a chair, mounted on the motion platform, in which the user sits during play of virtual reality content;

two motors to affect motion of the chair;

wherein one of the two motors independently affects the pitch of the chair without effect on the yaw of the chair, and wherein the other of the two motors independently affects the yaw of the chair without effect on the pitch of the chair; wherein the amount of rotation of the chair about a yaw axis is unlimited; wherein each of the two motors is mounted on the motion platform, wherein the motion platform further comprises a saddle, wherein the saddle is connected to the chair and rotates about the horizontal axis that is fixed relative to the motion platform, and wherein the rotation of the saddle about the horizontal axis drives the rotation in pitch of the connected chair.

13. The virtual reality station of claim 12, further comprising:

a digital electronic controller, mounted on the motion platform for controlling the behavior of the two motors.

14. The virtual reality station of claim 13, wherein the pitch and yaw of the chair, when coordinated with the play of the virtual reality content, results in a user perception of motion not physically being experienced by the user.

15. The virtual reality station of claim 14, wherein the user perception of motion not physically being experienced by the user is perceived translational motion.

* * * * *